(12) United States Patent
Smith

(10) Patent No.: US 9,278,394 B2
(45) Date of Patent: Mar. 8, 2016

(54) UNIVERSAL TUBULAR LOCK INSTALLATION SYSTEM

(71) Applicant: Ronald R. Smith, LaFargeville, NY (US)

(72) Inventor: Ronald R. Smith, LaFargeville, NY (US)

( * ) Notice: Subject to any disclaimer, the term of this patent is extended or adjusted under 35 U.S.C. 154(b) by 643 days.

(21) Appl. No.: 13/675,674

(22) Filed: Nov. 13, 2012

(65) Prior Publication Data

US 2014/0133929 A1    May 15, 2014

(51) Int. Cl.
*B23B 47/28* (2006.01)
*B27F 5/12* (2006.01)

(52) U.S. Cl.
CPC ............... *B23B 47/287* (2013.01); *B27F 5/12* (2013.01); *B23B 2247/06* (2013.01); *Y10T 408/567* (2015.01)

(58) Field of Classification Search
CPC ...... B23Q 9/0014; B23Q 9/0042; B27F 5/12; E05B 17/06; B23B 47/28; B23B 2247/12; B23B 2247/05; B23B 45/14; B23B 2247/06
USPC .................. 408/115 R, 103, 97; 144/144.51; 409/178
See application file for complete search history.

(56) References Cited

U.S. PATENT DOCUMENTS

| | | | | | |
|---|---|---|---|---|---|
| 310,710 | A | * | 1/1885 | Nichols | 408/97 |
| 2,268,930 | A | * | 1/1942 | Edwards | 408/103 |
| 2,466,023 | A | * | 4/1949 | Griffin | 408/79 |
| 2,605,791 | A | * | 8/1952 | Zern | 144/27 |
| 2,679,771 | A | * | 6/1954 | Schlage | 408/103 |
| 2,843,167 | A | * | 7/1958 | Rushton | 144/76 |
| 2,886,989 | A | * | 5/1959 | McCuen | 408/95 |
| 3,293,954 | A | * | 12/1966 | Russell et al. | 408/97 |
| 3,302,674 | A | * | 2/1967 | Russell et al. | 408/241 G |
| 3,338,277 | A | * | 8/1967 | Tornoe et al. | 144/27 |
| 3,392,607 | A | * | 7/1968 | Gieseke | 408/115 R |
| 3,500,884 | A | * | 3/1970 | Miller et al. | 144/3.1 |
| 3,635,571 | A | * | 1/1972 | Roberts et al. | 408/97 |
| 4,248,554 | A | * | 2/1981 | Boucher et al. | 408/97 |
| 4,306,823 | A | * | 12/1981 | Nashlund | 408/26 |
| 4,445,277 | A | * | 5/1984 | Keefe | 33/197 |
| 4,813,826 | A | * | 3/1989 | Riedel | 408/108 |

(Continued)

FOREIGN PATENT DOCUMENTS

| | | | | |
|---|---|---|---|---|
| DE | 2841200 | A | * | 4/1979 |
| DE | 3221155 | A1 | * | 12/1983 |
| DE | 29703821 | U1 | * | 6/1997 |

(Continued)

*Primary Examiner* — Daniel Howell

(57) ABSTRACT

A lock installation system of template drill and router guides that clamp to the door to prepare doors for locking and latching devices of many different brands. The system uses changeable template drill guides clamped to the faces of the door to drill the cross hole and other specialty holes needed. The edge drilling is done with an attachment for the proper size bit or with a ¼ inch pilot hole and hole saw. The attachment also allows the pre-drilling of the screw holes for mounting the latch assembly. After removing the edge drill setup, there is a router template to cut the mortize for the latch for commercial locksets. There is an attachment for residential locks to router cut the mortize cut out for the latch assembly. The embodiment will work on beveled and square edge doors of the two most common back sets. The embodiment will do door edge center, off set drilling and latch assembly mortizing. There is also a means to help align the embodiment on a door that has a pre-existing preparation. The smaller version of this embodiment is for where the door edge latch mortizing is not required.

4 Claims, 11 Drawing Sheets

(56) References Cited

U.S. PATENT DOCUMENTS

| | | | |
|---|---|---|---|
| 5,146,961 A * | 9/1992 | Schoeller | 144/3.1 |
| 5,222,845 A * | 6/1993 | Goldstein et al. | 408/103 |
| 6,343,632 B1 * | 2/2002 | Zivojinovic | 144/27 |
| 6,390,738 B1 * | 5/2002 | Fridman | 408/103 |
| 6,398,465 B1 * | 6/2002 | Monge | 408/1 R |
| 7,766,059 B2 * | 8/2010 | Kozina et al. | 144/144.51 |
| 2008/0251154 A1 * | 10/2008 | Gill | 144/84 |

FOREIGN PATENT DOCUMENTS

| | | |
|---|---|---|
| EP | 498510 A1 * | 8/1992 |
| FR | 2645576 A1 * | 10/1990 |
| GB | 2238749 A * | 6/1991 |
| WO | WO 8810177 A1 * | 12/1988 |

\* cited by examiner

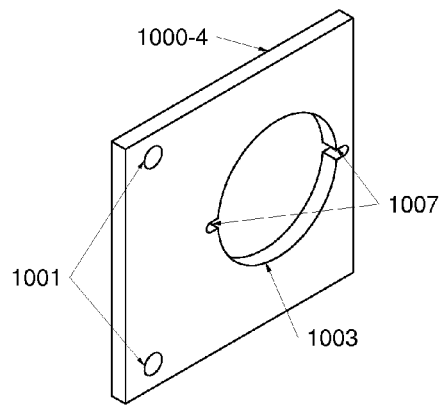
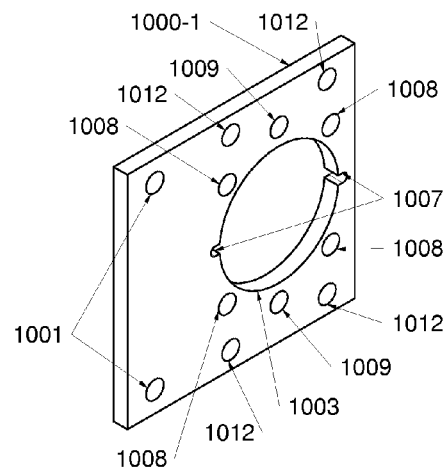
FIG. 18   FIG. 19
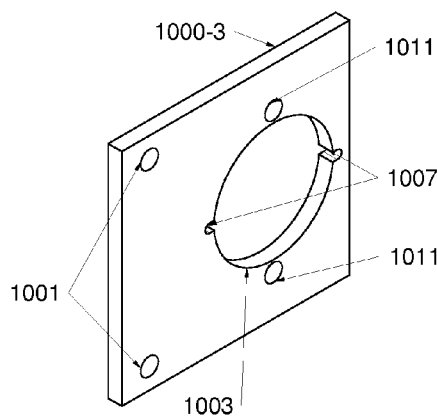
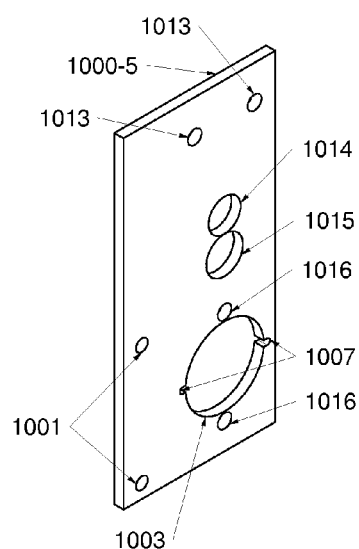
FIG. 20   FIG. 21

UNIVERSAL TUBULAR LOCK INSTALLATION SYSTEM

| Universal Tubular Lock Installation System | | |
|---|---|---|
| Numbers, | dates, | and names of prior art. |
| DES. 356,271 | Mar. 14, 1995 | Adamik et al. |
| 18,977 | Dec. 29, 1857 | L. Kittinger |
| 90,299 | May 18, 1869 | F. P. Pfleghar |
| 218,028 | Jul. 29, 1879 | H. A. Holt |
| 307,848 | Nov. 11, 1884 | S. W. Drowne, D. K, Hubbard |
| 310,710 | Jan. 13, 1885 | C. F. Nichols |
| 631,202 | Aug. 15, 1899 | J. E. Dearborn |
| 824,308 | Jun. 26, 1906 | B. K. Means |
| 891,606 | Jun. 23, 1908 | J. E. Doldt et al. |
| 971,627 | Oct. 04, 1910 | M. Nicholls |
| 992,500 | May 16, 1911 | A. A Harvie |
| 1,161,479 | Nov. 23, 1915 | J. J. Kelley |
| 1,210,942 | Jan. 02, 1917 | E. B. Jones |
| 1,432,485 | Oct. 17, 1922 | E. A. Moller |
| 1,580,412 | Apr. 13, 1926 | J. H. Collins |
| 1,633,370 | Jun. 21, 1927 | S. Hunter |
| 1,679,074 | Jul. 31, 1928 | R. L. Carter |
| 1,718,324 | Jun. 25, 1929 | F. W. Wappat |
| 1,738,227 | Dec. 03, 1929 | R. L. Carter |
| 1,762,457 | Jun. 10, 1930 | L. Uhrin |
| 1,954,368 | Apr. 10, 1934 | E. P. Sacrey |
| 1,919,900 | Jul. 25, 1933 | E. A. Moller |
| 2,033,072 | Mar. 03, 1936 | F. H. Harp |
| 2,193,204 | Mar. 12, 1940 | O. Nilson |
| 2,268,930 | Jan. 06, 1942 | W. S. Edwards |
| 2,519,468 | Aug. 22, 1950 | E. A. Hengst |
| 2,605,791 | Aug. 05, 1952 | W. B. Zern |
| 2,663,335 | Dec. 22, 1953 | W. H. Gohm, Sr. |
| 2,679,174 | May 25, 1954 | E. L. Schlage |
| 2,679,771 | Jun. 01, 1954 | E. L. Schlage |
| 2,790,470 | Apr. 30, 1957 | P. R. Graham |
| 2,792,727 | May 21, 1957 | B. A. McCuen |
| 2,814,219 | Nov. 26, 1957 | W. B. Zern |
| 2,832,154 | Apr. 29, 1958 | J. Bauer |
| 2,843,167 | Jul. 15, 1958 | E. R. Rushton |
| 2,886,989 | May 19, 1959 | B. A. McCuen |
| 2,945,520 | Jul. 19, 1960 | K. W. Grubb |
| 3,008,359 | Nov. 14, 1961 | B. A. Mackey |
| 3,021,734 | Feb. 20, 1962 | E. L. Schlage |
| 3,048,062 | Aug. 07, 1962 | I. C. Bass |
| 3,212,366 | Oct. 19, 1965 | F. J. Russell et al. |
| 3,263,723 | Aug. 02, 1966 | R. M. Sheffield et al. |
| 3,280,863 | Oct. 25, 1966 | L. T. Sturgis |
| 3,293,954 | Dec. 27, 1966 | F. J. Russell et al. |
| 3,302,674 | Feb. 07, 1967 | F. J. Russell et al. |
| 3,319,672 | May 16, 1967 | W. C. Phelps |
| 3,338,277 | Aug. 29, 1967 | J. A. Tornoe et al. |
| 3,339,601 | Sep. 05, 1967 | C. E. Christman et al. |
| 3,363,487 | Jan. 16, 1968 | W. H. Gehm, Sr. |
| 3,519,043 | Jul. 07, 1970 | R. E. Guill |
| 3,635,571 | Jan. 18, 1972 | Roberts et al. |
| 3,700,344 | Oct. 24, 1972 | Grumbach |
| 4,031,931 | Jun. 28, 1977 | Balcombe |
| 4,130,930 | Dec. 26, 1978 | Webster |
| 4,235,268 | Nov. 25, 1980 | Savary |
| 4,248,554 | Feb. 03, 1981 | Boucher et al. |
| 4,306,823 | Dec. 22, 1981 | Nashland |
| 4,331,411 | May 25, 1982 | Kessinger et al. |
| 4,392,307 | Jul. 12, 1983 | Wightman, Jr. |
| 4,445,277 | May 01, 1984 | Keefe |
| 4,485,857 | Dec. 04, 1984 | Norlie et al. |
| 4,715,125 | Dec. 29, 1987 | Livick |
| 4,813,826 | Mar. 21, 1989 | Riedel |
| 4,815,215 | Mar. 28, 1989 | Say lor et al. |
| 5,116,170 | May 26, 1992 | Palmer et al. |
| 5,154,214 | Aug. 13, 1992 | Hagerman |
| 5,222,845 | Jun. 29, 1993 | Goldstein et al. |
| 5,279,343 | Jan. 18, 1994 | Woods |
| 5,569,001 | Oct. 29, 1996 | Brutscher et al. |
| 5,573,352 | Nov. 12, 1996 | Matadobra |
| 5,762,115 | Jun. 09, 1998 | Shouse |
| 5,915,891 | Jun. 29, 1999 | Fridman |

-continued

| 6,193,449 B1 | Feb. 27, 2001 | Diaz |
|---|---|---|
| 6,343,632 B1 | Feb. 05, 2002 | Zivojinovic |
| 6,398,465 B1 | Jun. 04, 2002 | Monge |
| 7,316,527 B2 | Jan. 08, 2008 | Trettin et al. |
| 7,356,902 B2 | Apr. 15, 2008 | Snider et al. |
| 7,481,607 B2 | Jan. 27, 2009 | Rusiana et al. |
| 7,530,770 B2 | May 12, 2009 | Chao |

| US2003/0172535A1 | Sep. 18, 2003 | Grizzle |
|---|---|---|
| US2004/0240950A1 | Dec. 02, 2004 | Trettin et al. |
| US2004/0020809A1 | Feb. 05, 2004 | Allan et al. |
| US2004/0062618A1 | Apr. 01, 2004 | Trettin et al. |
| US2005/0072701A1 | Apr. 07, 2005 | Allan et al. |
| US2005/0129472A1 | Jun. 16, 2005 | Liu et al. |
| US2005/0220548A1 | Oct. 06, 2005 | Thomas |
| US2005/0220549A1 | Oct. 06, 2005 | Thomas |
| US2007/0041800A1 | Feb. 22, 2007 | Santos |
| US2007/0110528A1 | May 17, 2007 | Chao |
| US2007/0189868A1 | Aug. 16, 2007 | Snider et al. |
| US2007/0227016A1 | Oct. 04, 2007 | Tarter |
| US2008/0251154A1 | Oct. 16, 2008 | Gill |
| US2009/0272463A1 | Nov. 05, 2009 | Smith |

BACKGROUND OF THE INVENTION

1. Field of the Invention

The present invention deals with the field of devices usable for facilitating the cutting of holes in the face and the edge of doors for the placement of tubular style lever sets, knob sets, locksets, deadbolts, stand alone electronic and mechanical access control locksets and other types of locking and latching mechanisms therein.

Generally there are three methods of installing lock mechanisms on the door with the first being to hand measure all specifications of the lock to be installed on to the door. This is slow and mistakes are not uncommon. The second method is to use the paper template that comes with the lockset as this is faster and less chance of mistakes when taped to the door but paper templates are not always accurate because of printing problems and they are not always properly positioned on the door. Both hand measuring and template require the use of hand tools that are generally slower and less accurate. Often only one side of the door is marked and the hole(s) are not squarely drilled through the door and thus creating problems with the installation. The third method is to use a jig or a series of jigs for cutting the holes and although it is faster and more accurate than the hand measuring or paper templates, there has not been one single jig to do a total door lock preparation or to fix miss drilled doors. The present invention provides a novel means for fast and accurate drilling and routing of all the necessary holes and cut outs in the door in one setup with less chance of damage to the door for modem style tubular locksets.

2. Descriptions of the Prior Art

Numerous attempts have been made to create drilling and routing jigs for door lock installation however none have proved to be as universal and simple to use as the present embodiment as the listed prior art below prove.

Some examples of prior art are shown with U.S. Pat. No. 4,445,227 from May 1, 1984 by Keefe that shows a jig that can be programmed for many applications but would have trouble with the modem lever locks and access control locksets because of the number of holes required and their location. It would also be easy to make mistakes with this jig. U.S. Pat. No. 6,343,632B1 from Feb. 5, 2002 by Zivojinvic is a jig that can be used for mortise and cylindrical lock preparation and does use template plate drill guides on the faces of the door however is most suited for mortise lock preparation and does not provide a means to pre-drill the latch plate mounting screws.

General mortising jigs that can be used for some parts of lock installation can be seen in U.S. Pat. No. 1,762,457 from Jun. 10, 1930 by L. Uhrin and U.S. Pat. No. 2,663,335 from Dec. 22, 1953 by W. H. Gohm, Sr. and also in US Pending Patent number US2009/0272463A1 from Nov. 5, 2009 by Smith for use with a drill motor.

There are template jigs for adding specific holes however they are not for total lock preparation as in U.S. Pat. No. 7,481,607B2 from Jan. 27, 2009 by Rusiana et al is a template system for hospital paddles to only add 4 holes with different backsets. U.S. Pat. No. 5,915,891 from Jun. 29, 1999 by Friedman is a template for only one side of the door for extra holes for lever locks. U.S. Pat. No. 5,222,845 from Jun. 29, 1993 by Goldstein et al is for edge hole and cross drill for 2¾ inch backset with changeable plates with template drill guides for specialty holes with a plate only on one side of the door and when the drill brakes through the door, the drill is likely to splinter the wood from the unsupported hole unless the jig is removed and turned over and reinstalled. The jig has no means of providing latch plate mortising and pre-drilling of screw holes. The jig is not easily adjustable for backset and will not allow for easy re-drilling of a miss drilled door. US Pending Patent number US2007/0227016A1 from Oct. 4, 2007 by Tarter is a template system for mortise lock trim holes on both sides of door and does not do any door edge drilling or mortising.

There are many lockset installation jigs of many different configurations and variations that do only the main cross drill and edge drill however do not do latch mortising or specialty holes. U.S. Pat. No. 7,356,902B2 from Apr. 15, 2008 by Snider et al has adjustable backset and door thickness and is made of plastic for low usage with no specialty holes or latch mortising. U.S. Pat. No. 7,530,770B2 from May 12, 2009 by Chao is self adjusting for door thickness and is a hole saw drill guide with no specialty holes or latch mortising. US Pending Patent number US2003/0172535 A1 from Sep. 18, 2003 by Grizzle is a template for cross and edge drilling made from a plate with a 90 degree bend screwed to the door. The jig only guides the drill from one side of the door and does not do specialty holes or latch mortising. US Pending Patent number US2004/0240950 A1 from Dec. 2, 2004 by Trettin et al and US Pending Patent number US2004/0062618 A1 from Apr. 1, 2004 by Trettin et al, these two pending patents appear to be the same jig and are a hole saw drill guide for one side of the door screwed to the door with the latch screws and is made of plastic. This design would be for low usage and does not do specialty holes or latch mortising. US Pending Patent number US2004/0020809A1 from Feb. 5, 2004 by Allan et al and US Pending Patent number US2005/0072701A1 from Apr. 7, 2005 by Allan et al are wrap around template kits for only the cross drill and edge holes and does not do specialty holes or latch mortising. US Pending Patent number US2005/0129472A1 from Jun. 16, 2005 by Liu et al is a hole saw drill guide for only cross drill and edge holes and does not do specialty holes or latch mortising. US Pending Patent number US2005/0220548A1 from Sep. 6, 2005 by Thomas is a hole saw drill guide for only one side of the door and for only cross drill and edge holes and does not do specialty holes or latch mortising. US Pending Patent number US2005/0220549A1 from Oct. 6, 2005 by Thomas is only for cross drill and edge drill guide for only one side of the door and does not do specialty holes or latch mortising. US Pending Patent number US2007/0041800A1 from Feb. 22, 2007 by Santos is only for cross drill and edge drill guide from both sides of the door. This jig screws to the door with the latch screws with an unusual backset adjustment and is made of plastic and does not do specialty holes or latch mortising. US Pending Patent number US2007/0189868A1 from Aug. 16, 2007 by Snider et al is only for cross drill and edge drill guide for both sides of the door and is made of plastic and does not do specialty holes or latch mortising. US Pending Patent number US2007/0110528A1 from May 17, 2007 by Chao is only for cross drill and edge drill guide and is made of plastic and does not do specialty holes or latch mortising. U.S. Pat. No. 2,792,727 from May 21, 1957 by B. A. McCuen is hand operated and is only for the cross drill and edge drill holes and does not do specialty holes or latch mortising. U.S. Pat. No. 2,886,989 from May 19, 1959 by B. A. McCuen is hand operated and is only for the cross drill and edge drill holes and does not do specialty holes or latch mortising. U.S. Pat. No. 4,331,411 from May 25, 1982 by Kessinger et al is a drill system with bits for cross drill and edge drill holes and does not do specialty holes or latch mortising. U.S. Pat. No. 3,635,571 from Jan. 18, 1972 by Roberts et al is only for the cross drill and edge drill holes and does not do specialty holes or latch mortising. U.S. Pat. No. 3,338,277 from Aug. 29, 1967 by J. A. Tornoe et al is only for the cross drill and edge drill holes and does not do specialty holes or latch mortising. U.S. Pat. No. 3,302,674 from Feb. 7, 1967 by F. J. Russell et al is for only the cross drill hole with the drill guide size being changeable and does not do specialty holes or latch mortising. U.S. Pat. No. 3,293,954 from Dec. 27, 1966 by F. J. Russell et al is for only the cross drill and edge drill guide with backsets of 2¾ inch and 5 inch and does not do specialty holes or latch mortising. U.S. Pat. No. 3,212,366 from Oct. 19, 1965 by F. J. Russell et al is for only the cross drill and edge drill guide with backsets of 2¾ inch and 5 inch and does not do specialty holes or latch mortising. U.S. Pat. No. 3,048,062 from Aug. 7, 1962 by I. C. Bass is for only the cross drill and edge drill guide and has bits attached and does not do specialty holes or latch mortising. U.S. Pat. No. 3,021,734 from Feb. 20, 1962 by E. L. Schlage is for only the cross drill and edge drill guide and has bits attached and does not do specialty holes or latch mortising. U.S. Pat. No. 3,008,359 from Nov. 14, 1961 by B. A. Mackey is for only the cross drill and edge drill guide for a pilot drill and does not do specialty holes or latch mortising. U.S. Pat. No. 2,843,167 from Jul. 15, 1958 by E. R. Rushton is for only the cross drill and edge drill guide with backsets of 2⅜ inch and 2¾ inch and 5 inch and does not do specialty holes or latch mortising. U.S. Pat. No. 2,814,219 from Nov. 26, 1957 by W. B. Zern is for the cross drill and edge drill guide with a guide for drilling for the latch screws and does not do specialty holes or latch mortising. U.S. Pat. No. 2,679,771 from Jun. 1, 1954 by E. L. Schlage is only an edge drill guide with a cross drill marker and does not do specialty holes or latch mortising. U.S. Pat. No. 2,679,174 from May 25, 1954 by E. L. Schlage is only an edge drill guide and a cross drill marker for a pilot drill but one model has an adjustable backset cross drill guide. This jig does not do specialty holes or latch mortising. U.S. Pat. No. 2,519,468 from Aug. 22, 1950 by E. A. Hengst is only a pilot drill guide for the cross drill hole and does not do specialty holes or latch mortising. U.S. Pat. No. 2,033,072 from Mar. 3, 1936 by F. H. Harp is a door drill jig with an odd design and is very old. U.S. Pat. No. 1,919,900 from Jul. 25, 1933 by E. A. Moller is only for the cross drill and edge drill guide and may not be useable for modern locks. U.S. Pat. No. 4,248,554 from Feb. 3, 1981 by Boucher et al is only for the cross drill and edge drill guide with only 2⅜ inch and 2¾ inch backsets and does not do specialty holes or latch mortising. U.S. Pat. No. 7,316,527B2 from Jan. 8, 2008 by Trettin et al is a set of drill guides to cross drill and edge drill holes and is made of plastic with limited life and does not do specialty holes or latch mortising. U.S. Pat. No. 6,398,465B1 from Jun. 4, 2002 by Monge is for only the cross drill and edge drill guide for use with 2⅜ inch and 2¾ inch backset and has removable drill guide and does not do specialty holes or latch mortising. U.S. Pat. No. 4,715,125 from Dec. 27, 1987 by Livick is only for the cross drill and edge drill guide and screw holes for latch with adjustable backsets and does not do specialty holes or latch mortising. U.S. Pat. No. 4,130,930 from Dec. 26, 1978 by Webster is only for the cross drill and edge drill guide and does not do specialty holes or latch mortising Other prior art that primarily does only the cross drill and edge drill that no patent was found for but may exist includes an installation jig marketed by Weslock that does 2⅜, 2¾ and 5 inch backset in addition to the edge hole and uses a bit that fastens to the jig in one of two locations for the cross drill with a break through ring on the opposite side of the door and does not do specialty holes or latch mortising. Also not found in the patents is a jig that was marketed by Ilco that they named Accubore. That jig does the cross drill and the edge drill with several different size wood bits and break through rings for the cross drill. The jig has the backset adjustment which is a plate that rotates above and below the one inch edge drill with 2⅜, 2½ and 2¾ inch backsets. That jig also has a sleeve that goes in the 1 inch edge drill guide that is a drill guide for ⅞ inch diameter edge drill hole. The cross drill bits were hand operated but there was an adapter for a drill motor and does not do specialty holes or latch mortising. Another jig that no patent was found that was marketed as WildJig-1 uses a 2⅛ or 1½ inch cross drill and 1 inch edge drill and also has through bolt drilling for some grade 1 locks. The uniqueness of this jig is how it fastens to the door and speed of doing so but does not do latch mortising.

Jigs for doing mortising for mortise locksets with the use of a router include the following patents however are not designed to do cylindrical locksets with specialty holes as shown in US Pending Patent number US2008/0251154A 1 from Oct. 16, 2008 by Gill, U.S. Pat. No. 1,718,324 from Jun. 25, 1929 by F. W. Wappat, U.S. Pat. No. 1,738,227 from Dec. 3, 1929 by R. L. Carter, U.S. Pat. No. 4,235,268 from Nov. 25, 1980 by Savary are mortise templates for doors and jams and U.S. Pat. No. 2,605,791 from Aug. 5, 1952 by W. B. Zero is for router guide system for locks.

Other lock preparation jigs and mortising jigs date back into 1800's showing the need and the numerous attempts to devise the perfect jig. Most jigs were for mortise locks but some could be used for cylindrical. None of these jigs would be acceptable for the modern day locks requiring multiple specialty holes and none of these jigs use a router. Here are several patents that show this type of prior art: U.S. Pat. No. 1,210,942 from Jan. 2, 1917 by E. B. Jones, U.S. Pat. No. 992,500 from May 16, 1911 by A. A. Harvie, U.S. Pat. No. 891,606 from Jun. 23, 1908 by J. E. Doldt et al is old but could still be used, U.S. Pat. No. 1,633,370 from Jun. 21, 1927 by S. Hunter, U.S. Pat. No. 307,848 from Nov. 11, 1884 by S. W. Drowne, D. K. Hubbard, U.S. Pat. No. 18,977 from Dec. 29, 1857 by L. Kittinger is old general mortise, U.S. Pat. No. 90,299 from May 18, 1869 by F. P. Pfleghar, U.S. Pat. No. 218,028 from Jul. 29, 1879 by H. A. Holt, U.S. Pat. No. 310,718 from Jan. 13, 1885 by C. F. Nichols is old but could still be used, U.S. Pat. No. 824,306 from Jun. 26, 1906 by B. K. Means, U.S. Pat. No. 971,627 from Oct. 4, 1910 by M. Nicholls is old but could still be used, U.S. Pat. No. 1,580,412 from Apr. 13, 1926 by J. H. Collins, U.S. Pat. No. 2,193,204 from Mar. 12, 1940 by O. Nilson, U.S. Pat. No. 631,202 from Aug. 15, 1899 by J. E. Dearborn, U.S. Pat. No. 3,700,344 from Oct. 24, 1972 by Grumbach, U.S. Pat. No. 2,268,930 from Jan. 6, 1942 by W. S. Edwards, U.S. Pat. No. 1,432,485 from Oct. 17, 1922 by E. A. Moller, U.S. Pat. No. 4,306,823 from Dec. 22, 1981 by Nashland may have multiple number of door face plates for different locks and may be used with cylindrical locks, U.S. Pat. No. 3,363,487 from Jan. 16, 1968 by W. H. Gehm, Sr. is a jig for edge drilling for a mortise lock body.

There are a number of router templates to do various functions of lock preparations but none provide the means to include the specialty holes needed. The following patents are how a router can be used in lock preparation: U.S. Pat. No. 5,573,352 from Nov. 12, 1996 by Matadobra is a router template to cut cross drill holes in face of door, U.S. Pat. No. 1,679,074 from Jul. 31, 1928 by R. L. Carter is a router template system for mortising on face and edge of door, U.S. Pat. No. 4,815,215 from Mar. 28, 1989 by Saylor et al and U.S. Pat. No. 4,813,826 from Mar. 21, 1989 by Riedel is a router template for mortise locksets for edge and face of door, U.S. Pat. No. 1,954,368 from Apr. 10, 1934 by E. P. Sacrey is a jig for mortising of lock face plate on edge or latch face plate or mortising for mortise lock-jig is adjustable, U.S. Pat. No. 3,519,043 from Jul. 7, 1970 by R. E. Guill is an adjustable router template for latch plates and latch strikes, U.S. Pat. No. 5,279,343 from Jan. 18, 1994 by Woods is to mortise door edge and door jamb-odd setup, U.S. Pat. No. 2,832,154 from Apr. 29, 1958 by J. Bauer is a template system for door edge and strike that positions the template that is screwed to door or frame, U.S. Pat. No. 4,392,307 from Jul. 12, 1983 by Wightman, Jr. is an adjustable template for face plate-mortise or latch, odd design, U.S. Pat. No. 5,154,214 from Aug. 13, 1992 by Hagerman is a template for mortising door hardware.

There are some jigs that are only drill guides for doing various parts of lock preparation, none of which do a total door preparation. U.S. Pat. No. 5,116,170 from May 26, 1992 by Palmer et al is for adding top and bottom holes for through bolt of the brand "Best" locks, U.S. Pat. No. 5,569,001 from Oct. 29, 1996 by Brutscher et al is a drill guide for pilot drill holes to cross drill and edge holes, U.S. Pat. No. 1,161,479 from Nov. 23, 1915 by J. J. Kelley is for door edge drill hole only.

Lockset installation jigs that do the cross drill and edge drill and specialty holes but does not do the latch plate mortise would include: U.S. Pat. No. DES.356,271 from Mar. 15, 1995 by Adamik et al is for cross drill and edge holes and specialty holes-only one side of door with multiple backsets, U.S. Pat. No. 6,193,449B1 from Feb. 27, 2001 by Diaz is a device to drill the cross and edge holes that pre-drill latch screw holes to fasten jig to the door-jig has removable cross drill guide and guide is only on one side of the door.

There are machines available to do the door lock preparation in a factory setting. Some of these machines will do a total lock preparation while others only do parts of the preparation. Most of these machines are not portable however they show the need for having jigs or equipment to do the door preparation. None of these machines are light weight and universal to do a total lock preparation for a cylindrical type lock in the field. Examples of these machines are seen in U.S. Pat. No. 3,319,672 from May 16, 1967 by W. C. Phelps is not portable, U.S. Pat. No. 3,339,601 from Sep. 5, 1967 by C. E. Christman et al is not portable, U.S. Pat. No. 3,280,863 from Oct. 25, 1966 by L. T. Sturgis is not portable, U.S. Pat. No. 2,790,470 from Apr. 30, 1957 by P. R. Graham is a mortising and boring machine, U.S. Pat. No. 2,945,520 from Jul. 19, 1960 by K. W. Grubb is not portable, U.S. Pat. No. 3,263,723 from Aug. 2, 1966 by R. M. Sheffield et al is not portable, U.S. Pat. No. 4,031,931 from Jun. 28, 1977 by Balcombe is portable and U.S. Pat. No. 4,485,857 from Dec. 4, 1984 by Norlie et al does total lock preparation and hinges preparation, not for field use.

There are jigs available for doing mortising with the use of a router of the latch plate and in some cases the jig will do the strike plate on the door frame. These jigs are designed to do just one part of the lock installation unlike the current embodiment that does the total door lock preparation. Some examples of these jigs would be U.S. Pat. No. 5,762,115 from Jun. 9, 1998 by Shouse is a T-shaped template for latch on 1⅜ inch thick door and 1¾ inch thick door and hinge guide-jig is clamped to door.

This prior art illustrates the many devices that do only part of the installation and are difficult to use and as such the present invention has been designed as an accurate total door lock installation device.

SUMMARY OF THE INVENTION

The present invention overcomes the deficiencies of the other jigs by providing a lock installation system for use on wood, fiberglass and metal doors that is one setup that will totally prepare the door for lock installation.

The main frame of the device is comprised of end blocks, backset adjustment, spacer plate, main base plate, main support arm, secondary support arm and the pressure support arm, provide for a router template center cut out guide in the main base plate to cut the mortise for 1⅛ inch wide latch mortise and also allows for fast changing of the backset for 2⅜ inch or 2¾ inch on each end of the main flame assembly. The main frame allows for centering or offset drilling of the edge hole and latch mortise. There are door drill plates fastened to the main support arm and secondary support arm of the main frame that act as a template of drill guides for the various different size holes and location as to brand of lock.

The device is held on the door by pressure from a pressure bolt located in the pressure support arm of the main frame to one of the door drill plates and with the door being sandwiched between the other door drill plate which causes a clamping action on the door and thus holding the device on the door. The device forms a U-shape around the door. The door drill plates come in sets of two for the many different brands of locks with the different configurations of holes.

There are two attachments that are held on the main base plate by a special bolt in each of the two end blocks and the first attachment is the edge drill setup. There are four different models with all having drill guides to pre-drill the latch screws. The only difference between the models is the diameter of the hole for the latch assembly. The first model has ¼ inch hole as a pilot hole for a hole saw, ⅞ inch hole is for residential locksets, 1 inch hole is for most locksets and as a guide to align the device properly for re-drilling or adding extra holes to an existing lockset preparation and the model with the 1⅛ inch hole is for specialty locks. The second attachment is the secondary base plate that is a router template center cut out guide for the narrow one inch wide latch face plate.

It is an object of the present invention to provide a lock installation system to be simple and fast to install and remove from door.

It is an object of the present invention to provide a lock installation system to accommodate lock installation requirements of 2⅜ inch backset and 2¾ inch backset.

It is an object of the present invention to provide a lock installation system to accommodate doors 1¼ inch thick to 2⅜ inch thick.

It is an object of the present invention to provide a lock installation system to do both off center edge and center of edge of door drilling and mortising.

It is an object of the present invention to provide a lock installation system to do both mortising on door edge for 1 inch wide and 1⅛ inch wide latch face plates.

It is an object of the present invention to provide a lock installation system to pre-drill the latch screw holes.

It is an object of the present invention to provide a lock installation system to protect wood doors from splitting when drilling the door edge by means of sandwiching the door between the door drill plates.

It is an object of the present invention to provide a lock installation system to drill or re-drill the main cross hole in the door faces.

It is an object of the present invention to provide a lock installation system to drill the specialty holes for lever locks and access control locks.

It is an object of the present invention to provide a lock installation system to do multi-door lock preparations of door 1⅜ inch thick or 1¾ inch thick with minimal setup for the same type of lock preparation.

The primary purpose of the smaller embodiment is to provide a means to alter an existing preparation or add holes to an existing preparation where door edge latch mortising is not required.

BRIEF DESCRIPTION OF THE DRAWINGS

While the invention is particularly pointed out and distinctly claimed in the concluding portions herein, a preferred embodiment is set forth in the following detailed description which may be best understood when read in connection with the accompanying drawings, in which:

FIG. 18 is of a door drill plate for cylindrical locksets.

FIG. 19 is of a door drill plate for most grade 1 levers and some hospital paddle locks.

FIG. 20 is of a door drill plate for lever sets with the through bolt hole centers 2.547 inches apart.

FIG. 21 is of a door drill plate for electronic stand alone access control.

DETAILED DESCRIPTION OF THE PREFERRED EMBODIMENT

Figure 1:
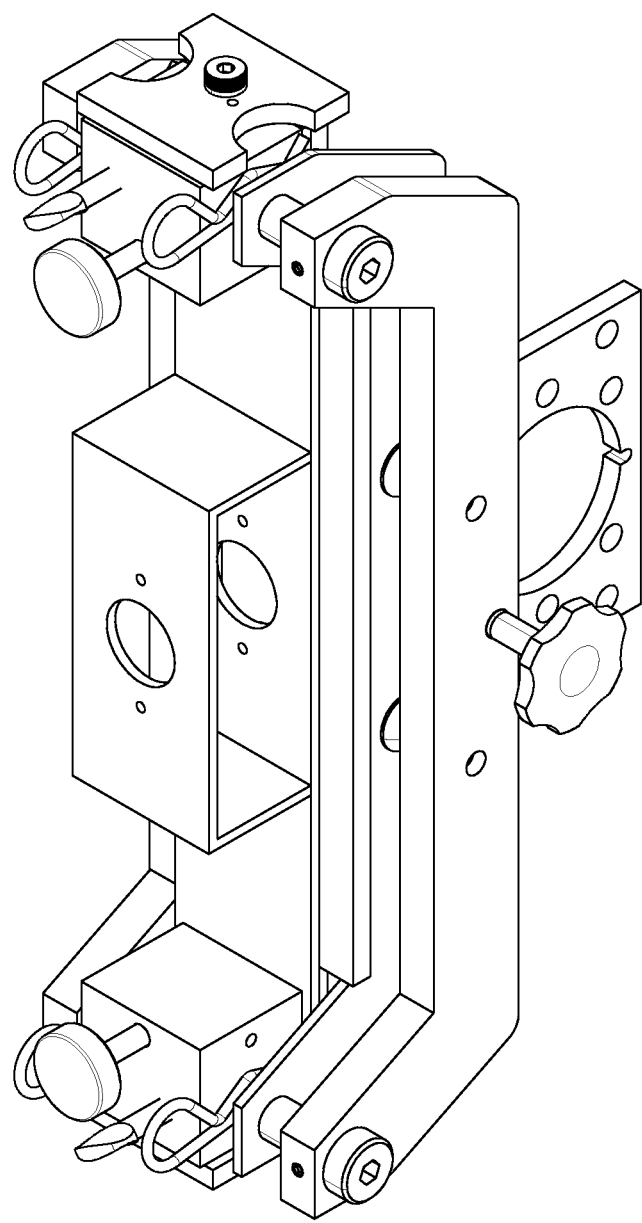
FIG. 1 is an isometric view of the embodiment of a lock installation device of the present invention showing the backset adjustment mounted to the two end blocks that are mounted to the main base plate that has the door edge drill setup installed with knob bolt with point to lock on secondary base plate or edge drill setups, secondary support arm, pressure support arm with pressure bolt and door plate, centering clips in main support shaft and thumb turn shaft that locks the end block to the support shaft bolt.
Figure 2:
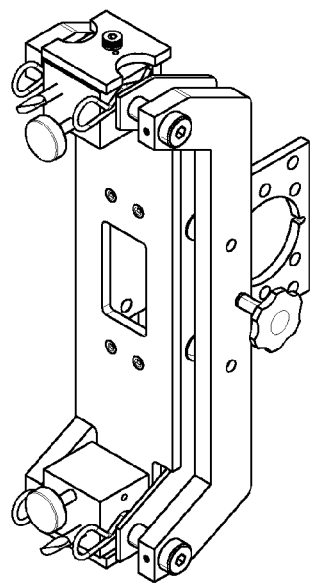
FIG. 2 is an isometric view of the embodiment of a lock installation device of the present invention showing the backset adjustment mounted to the two end blocks that are mounted to the main base plate, knob bolt with point to lock on secondary base plate or edge drill setups, secondary support arm, pressure support arm with pressure bolt and door plate, centering clips in main support shaft and thumb turn shaft that locks the end block to the support shaft bolt.
Figure 3:
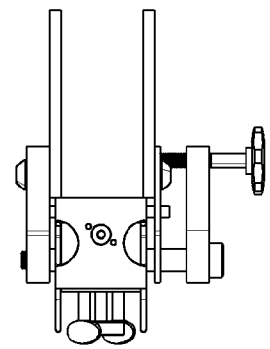
FIG. 3 is a top view of the embodiment of a lock installation device of the present invention showing the backset adjustment, knob bolt with point to lock on secondary base plate or edge drill setups, main support arm with a door drill plate attached, secondary support arm with a door drill plate attached, pressure support arm with pressure bolt, support shaft bolt with centering clips installed and thumb turn shaft that locks the end block to the support shaft bolt.
Figure 4:
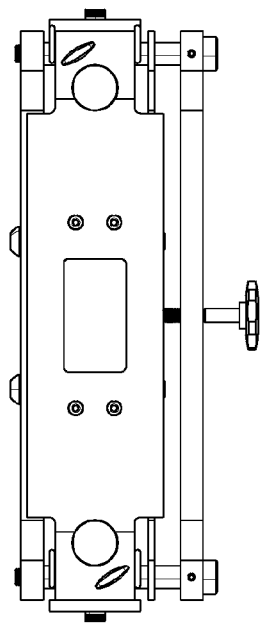
FIG. 4 is a front view of the embodiment of a lock installation device of the present invention showing the main base plate with the routing template, end blocks, backset adjustment, support shaft bolts with centering clips installed, main support arm and pressure support arm with pressure bolt knob bolt with point to lock on secondary base plate or edge drill setups and thumb turn shaft that locks the end block to the support shaft bolt.
Figure 5:
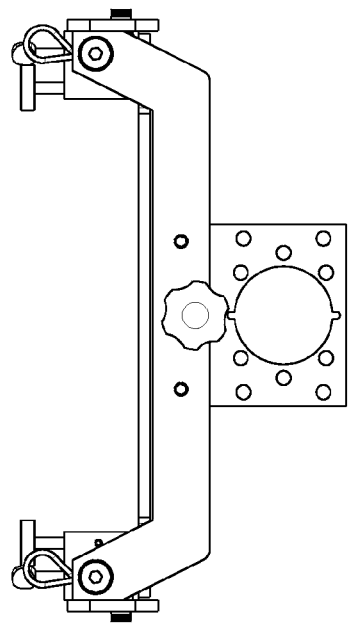
FIG. 5 is a right side view of the embodiment of a lock installation device of the present invention showing the pressure support arm with pressure bolt, backset adjustments, knob bolt with point to lock on secondary base plate or edge drill setups and one of two door drill plates, centering clips and thumb turn shaft that locks the end block to the support shaft bolt.
Figure 6:
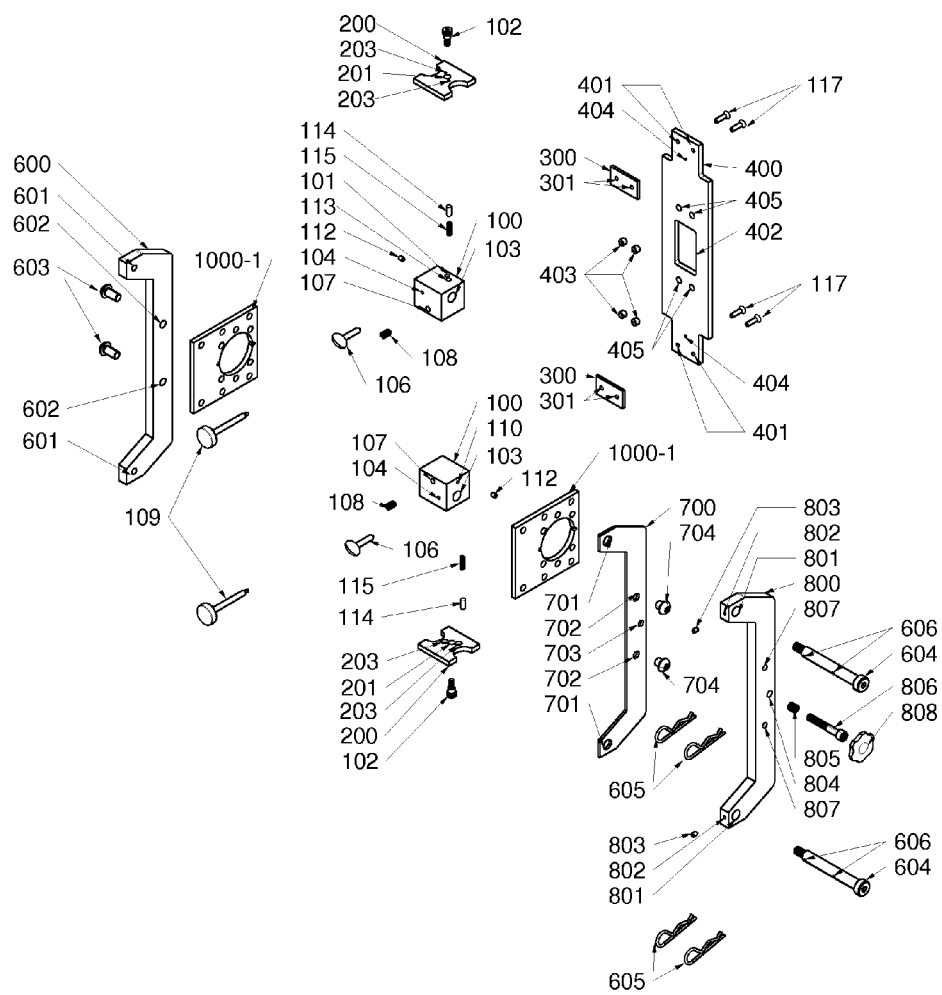
FIG. 6 is the exploded view of the embodiment of a lock installation device of the present invention showing all parts except the attachments and all the door drill plates that are available.
Figure 7:
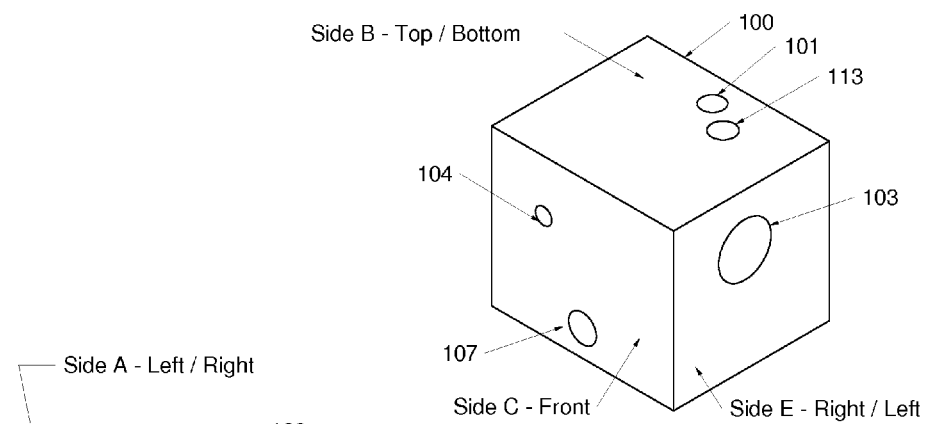
FIG. 7 is the top right isometric view of the end block as viewed used in its top position showing its respective sides and holes. This part is used in two different positions and the orientation causes the top, bottom, left side and right side to swap position. The front and back remain the same. Sides B, C and E are shown.
Figure 8:
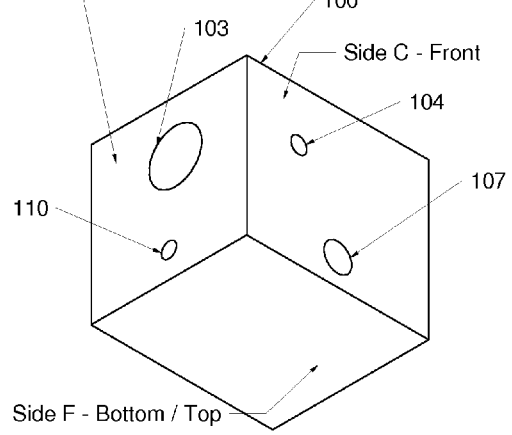
FIG. 8 is the bottom left isometric view of the end block as viewed used in its top position showing its respective sides and holes. This part is used in two different positions and the orientation causes the top, bottom, left side and right side to swap position. The front and back remain the same. Sides A, C and F are shown
Figure 9:
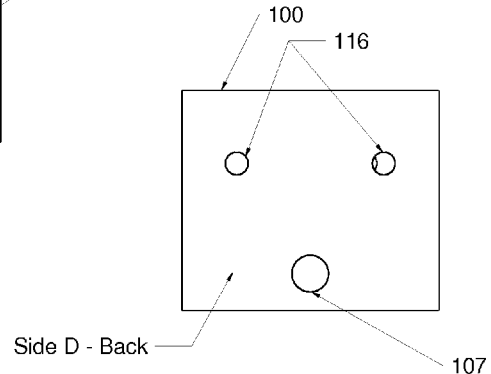
FIG. 9 is the rear view of the top end block showing the back side and holes. This part is in two different positions and the orientation causes the top, bottom, left side and right side to swap position. The from and back remain the same. Side D is shown.
Figure 10:
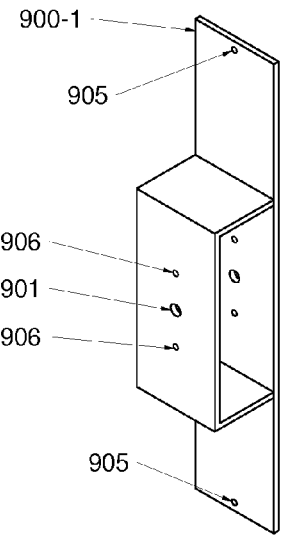
FIG. 10 is the edge drill setup attachment with holes to pre-drill latch screws and center ¼ inch pilot hole for hole saw to drill edge hole.
Figure 11:
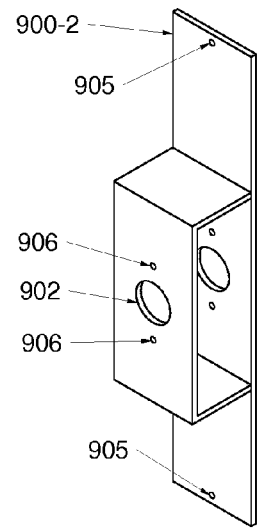
FIG. 11 is edge drill setup attachment with holes to pre-drill latch screws and center ⅞ inch edge hole.
Figure 12:
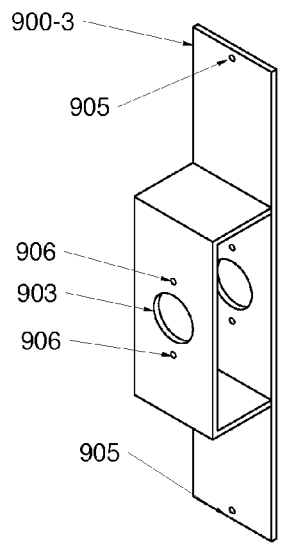
FIG. 12 is edge drill setup attachment with holes to pre-drill latch screws and center 1 inch edge hole.
Figure 13:
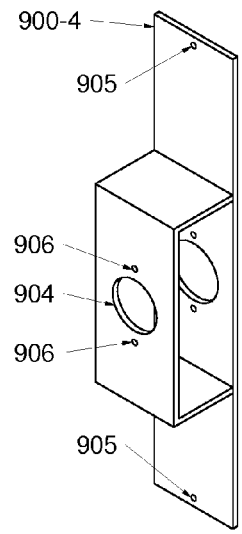
FIG. 13 is edge drill setup attachment with holes to pre-drill latch screws and center 1⅛ inch edge hole.
Figure 14:
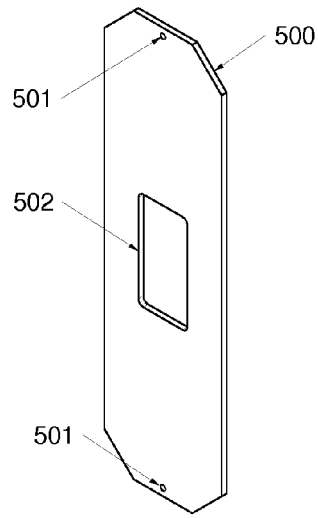
FIG. 14 is the secondary base plate as attachment to router cut a 1 inch wide latch mortise.
Figure 15:
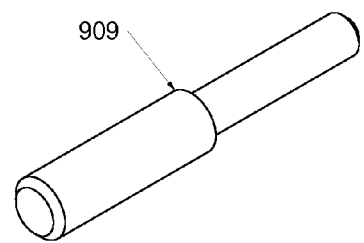
FIG. 15 is the wood dowel with 1 inch on one end and ⅞ inch on the other end.
Figure 16:
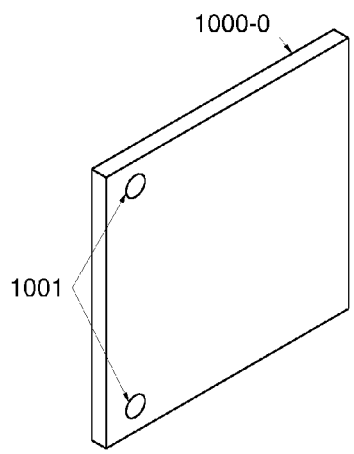
FIG. 16 is a of a blank door drill plate.
Figure 17:
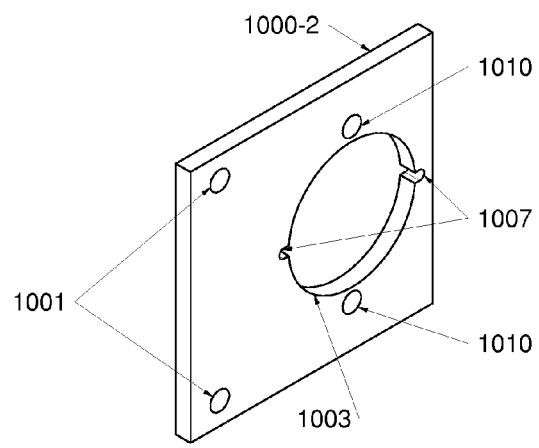
FIG. 17 is of a door drill plate for most grade 2 import lever locksets with the through bolt hole centers 2.594 inches apart.
Figure 22:
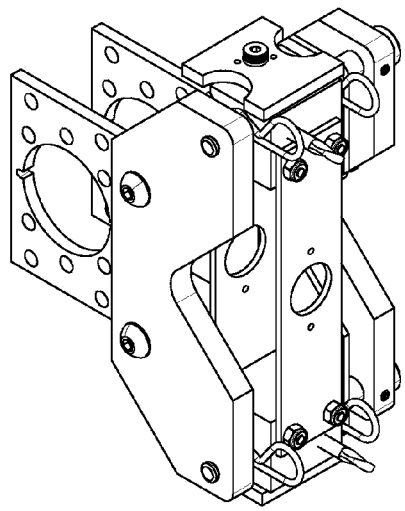
FIG. 22 is an isometric view of a smaller version of the embodiment of a lock installation device that uses many of the same principles as the full size embodiment of the present invention showing the end blocks, thumb turn shaft, backset adjustment, edge drill plates, pressure support arm, secondary support arm with door drill plate, main support arm with door drill plate and centering clips in main support shaft.
Figure 23:
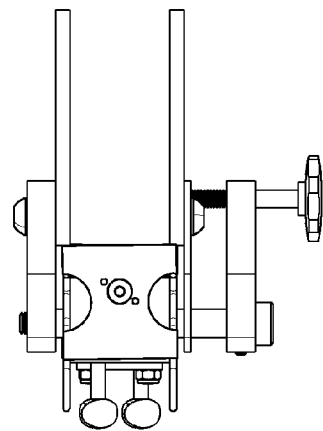
FIG. 23 is a top view of a smaller version of the embodiment of a lock installation device that uses many of the same principles as the full size embodiment of the present invention showing the backset adjustment, end blocks, thumb turn shaft, main support arm with door drill plate, secondary support arm with door drill plate, pressure support arm with pressure bolt and support shaft bolt with centering clips.
Figure 24:
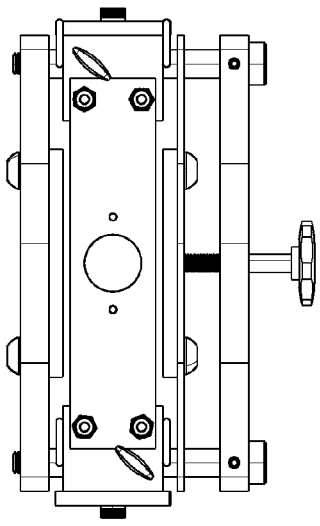
FIG. 24 is a front view of a smaller version of the embodiment of a lock installation device that uses many of the same principles as the full size embodiment of the present invention showing main support arm with door drill plate, backset adjustment, end blocks, thumb turn shaft, door edge drill plate, secondary support arm with door drill plate, pressure support arm with pressure bolt and support shaft bolt.
Figure 25:
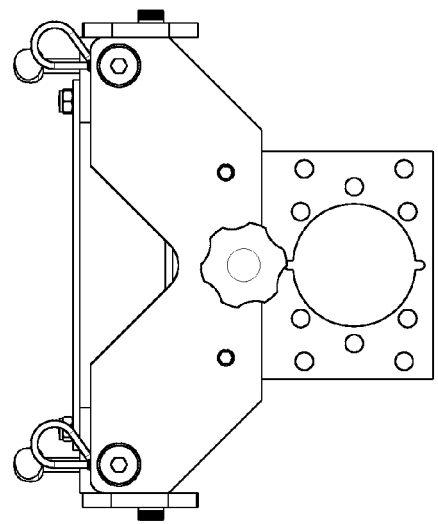
FIG. 25 is a right side view of a smaller version of the embodiment of a lock installation device that uses many of the same principles as the full size embodiment of the present invention showing backset adjustment, end blocks, thumb turn shaft, door edge drill plate, pressure support arm with knob of the pressure bolt, door drill plate and main support shaft with centering clips.
Figure 26:
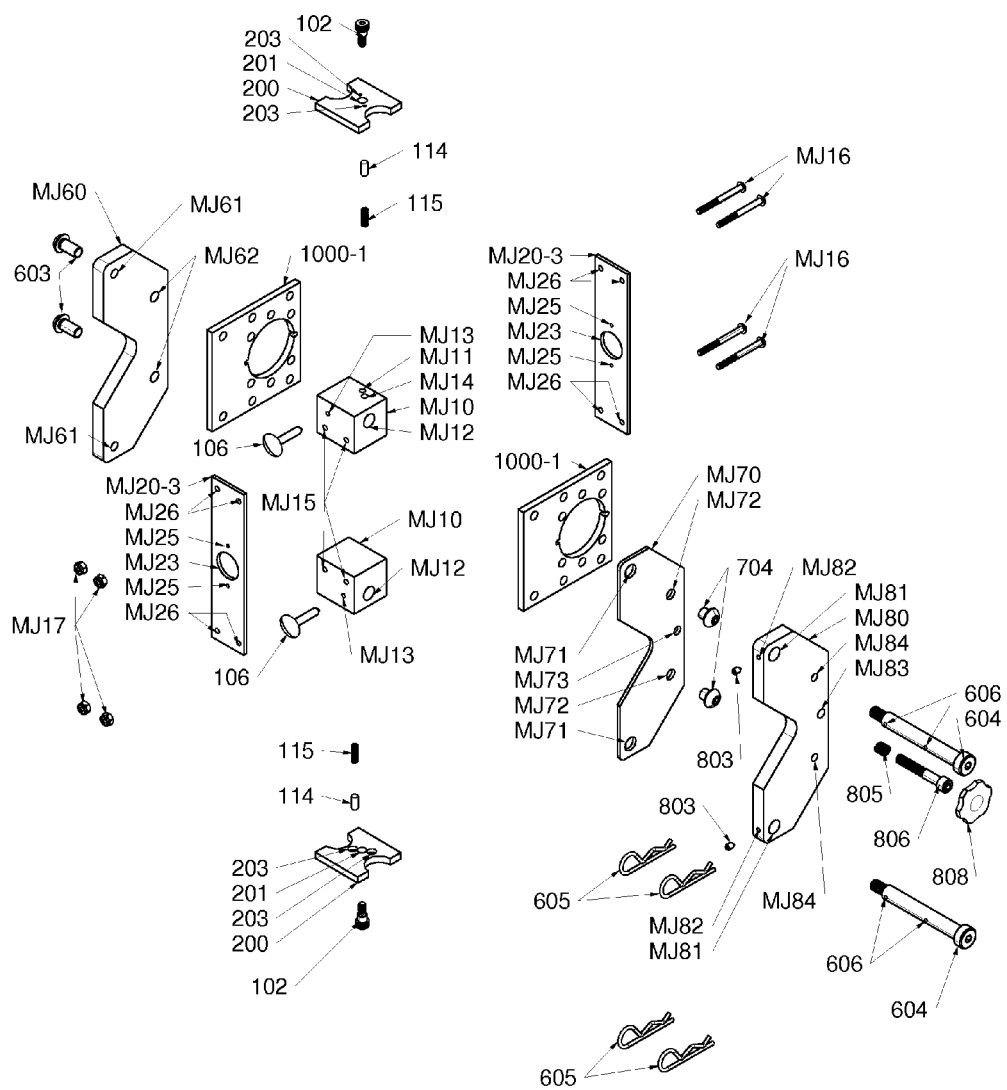
FIG. 26 is an exploded view of a smaller version of the embodiment of a lock installation device that uses many of the same principles as the full size embodiment of the present invention showing all the parts used in the smaller embodiment with the exceptions of all the drill edge plates that are available and all the door drill plates that are available.
Figure 27:
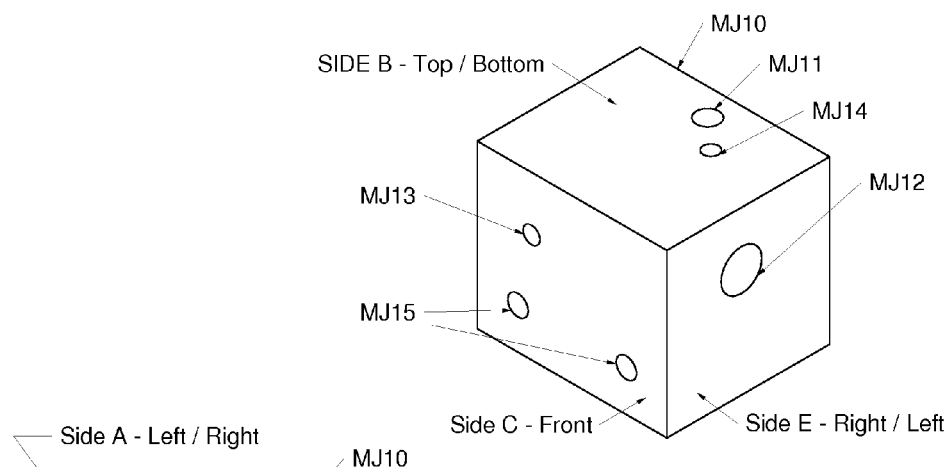
FIG. 27 is the top right isometric view of the end block as viewed used in its top position showing its respective sides and holes. This part is used in two different positions and the orientation causes the top, bottom, left side and right side to swap position. The front and back remain the same. Sides B, C and E are shown.
Figure 28:
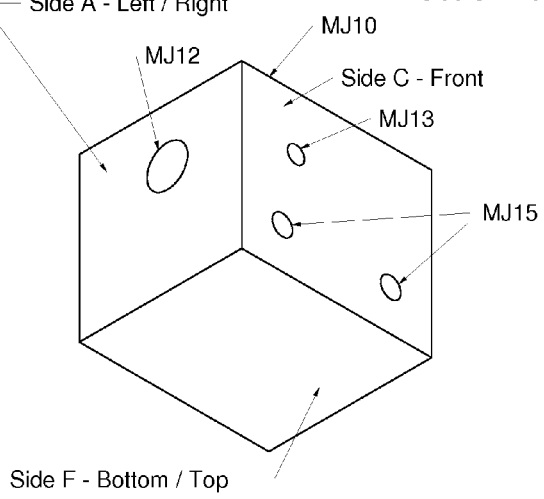
FIG. 28 is the bottom left isometric view of the end block as viewed used in its top position showing its respective sides and holes. This part is used in two different positions and the orientation causes the top, bottom, left side and right side to swap position. The front and back remain the same. Sides A, C and F are shown.
Figure 29:
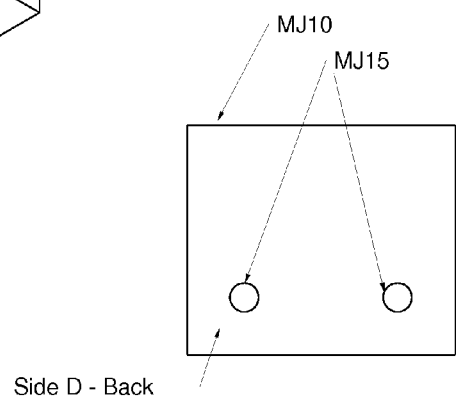
FIG. 29 is the rear view of the top end block showing the back side and holes. This part is in two different positions and the orientation causes the top, bottom, left side and right side to swap position. The front and back remain the same. Side D is shown.
Figure 30:
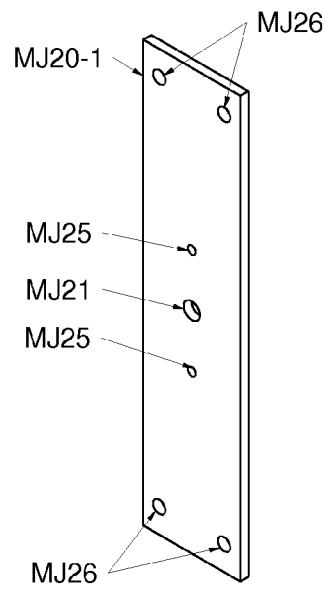
FIG. 30 is the drill edge plate used on the smaller embodiment with center ¼ inch center hole.
Figure 31:
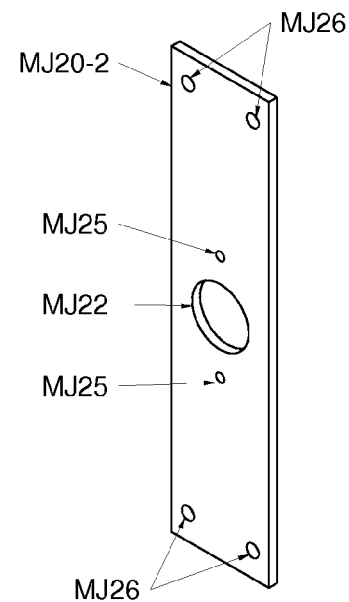
FIG. 31 is the drill edge plate used on the smaller embodiment with center ⅞ inch hole.
Figure 32:
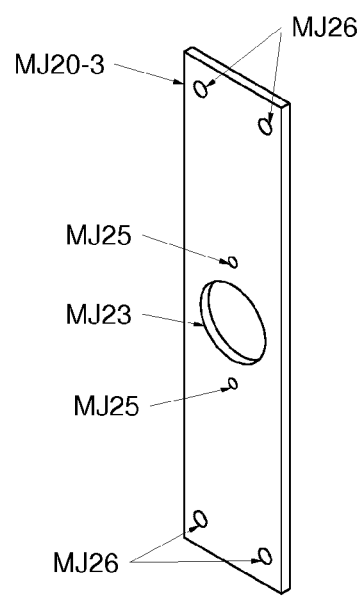
FIG. 32 is the drill edge plate used on the smaller embodiment with center 1 inch hole.
Figure 33:
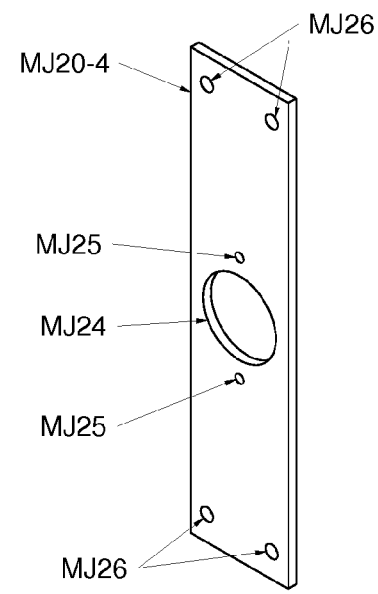
FIG. 33 is the drill edge plate used on the smaller embodiment with center 1⅛ inch hole.

The present invention provides a tubular style lock installation device having body members of two end blocks 100 as a means that each provides for the mounting of the backset adjustment 200 with the use of threaded hole 101 for a shoulder bolt 102 on side B of end block 100, side A of end block 100 having a hole 103 for body member of support shaft bolt 604 that extends to side E for support of three body member parts known as main support arm 600 also secondary support arm 700 and the pressure support arm 800. Side C of end block 100 has a threaded hole 104 for thumb turn 106 to lock support shaft bolt 604 from moving during use. Side C of end block 100 also has a second threaded hole 107 with Heli-coil 108 for longer life that extends to side D of end block 100 for knob 109 that has a threaded shaft with a point that is a means to lock secondary base plate 500 or edge drill setup series 900 in place at a designated location to drill and mortise door edge on center or off center. Side A of end block 100 has a threaded hole 110 that intersects with threaded hole 107 on side C of block 100 that extends to side D of end block 100. The purpose of hole 110 is for use of a nylon tipped set screw 112 as a means for a friction break for knob 109 that has a threaded shaft with a point. Side D of end block 100 also has two other threaded holes 116 for a means of mounting body member main base plate 400 and spacer plate 300. Side B of end block 100 in addition to the threaded hole 101 for a means to mount the backset adjustment 200 also has a hole 113 for a pin 114 and spring 115 that is a means to creates a backset rotation limit to prevent the free spinning of the backset adjustment 200. There is a small hole 203 in each backset adjustment 200 as a means to depress the rotation limit pin 114 to allow rotation of backset adjustment 200 for the needed setting of 2⅜ inch backset or 2¾ inch backset. The location of the backset adjustment hole 101 on side B of end block 100 and the location of support shaft bolt hole 103 on sides A and E are necessary for the accuracy for backset. The preferred material for the end block 100 is aluminum because of it is wear resistance and will not rust and also is light in weight. The end block 100 must be of size to allow the main support arm 600 and the secondary support arm 700 to close for a 1¼ inch thick door. The door thickness for this embodiment is 1¼ inch to 2⅜ inch but also maybe increased for thicker doors by changing the two support shaft bolts 604 to longer support shaft bolts. For thinner than 1¼ inch thick door would require thicker door drill plate series 1000 or a shim between door drill plate series 1000 and main support arm 600 and secondary support arm 700.

The two end blocks 100 slide freely on the two support shaft bolts 604 with the main base plate 400 and two spacer plates 300 and with attachment secondary base plate 500 if installed or edge drill setup series 900 if installed. The two end blocks 100 can be locked to the two support shaft bolts 604 with thumb turn 106 on each end block 100 as a means of centering the main base plate 400 on the edge of the door or to do offset drilling on the edge of the door. There may be centering clips 605 installed into holes 606 in the support shaft bolts 604 on each side of each end block 100 as a means for a dedicated door edge drilling setup series 900.

The backset adjustment 200 is a plate two inches wide to hit against the door edge as a means of setting the backset of 2⅜ inch or 2¾ inch from the latch center on edge of the door to the center of the main hole in the door face. The backset adjustment 200 should have cut outs on each side as a means to identify that it is the side of the backset adjustment. The width of two inches is to span across any cut out or damage and to aid in centering on the door. The offset hole 201 in backset adjustment 200 is what determines the backset of 2⅜ inch or 2¾ inch and there for must be ⅜ inch difference from one face to the other. Other cosmetic designs maybe used as long as the above specifications are met. There is a small hole 203 in each backset adjustment 200 as a means to depress the rotation limit pin 114 to allow rotation of backset adjustment 200 for the needed setting of 2⅜ inch backset or 2¾ inch backset. There is a step drilled hole in two locations 203 on the backside of backset adjustment 200 for the rotation limit pin 114 as a means to prevent free rotation of backset adjustment 200 but to allow some rotation on each of the two settings for use on beveled doors.

The spacer plate 300 is a means used to create a void between side D of the end blocks 100 and main base plate 400 to allow the ends of secondary base plate 500 with centering hole 501 or the ends of the edge drill setup series 900 with centering hole 905 to enter that void and to be centered and secured to the main base plate 400 by knob 109 that has a threaded shaft that threads through the end block 100 side C hole 107 and comes out end block 100 hole 107 side D and is pointed on the end. The spacer plate 300 is not the same size of end block 100 side D and has two holes 116 for the two screws 117 that attach the main base plate 400 to the end blocks 100 side D.

The main base plate 400 is a guide with center cut out hole 402 for a router with ½ inch diameter guide attachment and ¼ inch router bit as a means to cut the mortise cut out for a latch plate of 1⅛ inch wide by 2¼ inch long. The main base plate 400 must be adequate width and thickness to safely support the router but narrow on the ends that connect to the end blocks 100 to allow both the main support arm 600 and the secondary support arm 700 to pass to accommodate for door thickness. The main base plate 400 has two holes 401 on each end as a means to fasten the spacer plates 300 and end blocks 100. The main base plate 400 may also have 4 holes 405 with harden drill guide inserts 403 as a means for drilling mounting holes for installing latch mounting plates in steel doors. The center cut out guide 402 in the center of main base plate 400 must be large enough to compensate for the size of the router guide to cut 1⅛ inch wide by 2¼ inch long hole. The depth of the cut is determined by the latch thickness and is set on the router. The main base plate 400 is also used as a base as a means to support the secondary base plate 500 and edge drill setup series 900. There is a locator hole 404 in each end of the main base plate 400 for the point of the threaded shaft on knob 109 to enter as a means to stabilize and properly position the secondary base plate 500 with hole 501 or drill edge setup series 900 with hole 905.

The secondary base plate 500 is a plate of thin material of the same width as the main base plate 400 that is placed on top of the main base plate 400 as a means to change the size of the router template center cut out guide 402 in the main base plate 400 to cut door edge latch plate mortise cut with a router that has a ½ inch diameter template guide for use with template center cut out guide 502 and ¼ inch diameter bit for a 1 inch by 2¼ inch latch assembly face plate. The secondary base plate 500 is held in place on the main base plate 400 by the end of the secondary base plate 500 sliding in to avoid on each end of the main base plate 400 and under side D of each end block 100 in which knob 109 with a threaded shaft that has a point that enters a small hole 501 in each end of the secondary base plate 500 that provides a means to assure perfect alignment of the secondary base plate 500 to the main base plate 400.

The main support arm 600 is a U-shape plate with a threaded hole 601 in each end for a support shaft bolt 604 from each end block 100 and must pass the main base plate 400 to allow for door thickness adjustment. The main support arm 600 will have two holes 602 in the long section of the U-shaped for bolts 603 for a means to mount door drill plate series 1000 and must be of sufficient strength to with stand the clamping pressure to the door.

The secondary support arm 700 is a U-shaped plate with hole 701 in each end for the support shaft bolt 604 to pass through and must also be able to pass the main base plate 400. On the long section of the arm there will be three holes with the center hole 703 as a means to hold the pressure bolt 806 in position to exert pressure on the door drill plate series 1000 to clamp the embodiment to the door. Holes 702 on each side of center hole 703 for bolts 704 are a means to bolt the door drill plate series 1000 to the secondary support arm 700. The secondary support arm 700 can move on support shaft bolts 604 as a means for easy install and removal of the embodiment from door.

The pressure support arm 800 is a U-shape plate that is connected to support shaft bolt 604 from each end block 100 with a hole in each end 801 on the flat of the plate for the support shaft bolt 604 to pass through. The support shaft bolt 604 is locked to the pressure support arm 800 with a set screw 803 in hole 802 on the edge of the plate on each end that intersects with the support shaft bolt 604. The pressure support arm 800 is U-shaped as a means to allow the base of the router to pass unobstructed. The pressure support arm 800 has a hole 804 in the center of the long section of the U that is threaded with a Heli-coil 805 to give longer life and stronger threads for the pressure bolt 806 with knob 808 that is aligned with a matching hole 703 in the secondary support arm 700 as a means to apply pressure on the door drill plate series 1000 to clamp the embodiment to the door. Holes 807 provide access for bolts 704.

The edge drill setup series 900 is a complete setup that comes in 4 models of 900-1, 900-2, 900-3, 900-4 and is a means for drilling or to assist in drilling or re-drilling the edge hole in the door. The edge drill setup series 900 consists of two steel plates of which one is U-shaped and is permanently fastened to the other. The assembly is fastened to the embodiment in the same manner as the secondary base plate 500 by being fastened to the main base plate 400 in a void between the main base plate 400 and side D of each end block 100 with the point of the threaded shaft from knob 109 entering a small hole 905 in each end of the edge drill setup series 900 as a means that assures perfect alignment of edge drill setup series 900 on the main base plate 400. There are three other holes in the edge drill setup series 900 with the two holes 906 are a means for pre-drilling the latch mounting screw holes and the center hole 901, 902, 903, 904 are a means for drilling the edge hole. The edge drill setup 900-1 has center hole 901 that is ¼ inch diameter for a pilot hole for a hole saw. The edge drill setup 900-2 has center hole 902 that is ⅞ inch diameter. The edge drill setup 900-3 has center hole 903 that is 1 inch diameter. The edge drill setup 900-4 has center hole 904 that is 1⅛ inch diameter.

The main frame of the device is comprised of the end blocks 100, backset adjustments 200, spacer plates 300, main base plate 400, main support arm 600, secondary support arm 700, the pressure support arm 800 with related hardware of screws, set screws and shoulder bolts 102, support shaft bolts 604, support shaft lock 105 and thumb turn 106 along with backset rotation limit parts 114 and 115 and the knob 109 with threaded shaft with point and pressure bolt 806 with knob 808 along with miscellaneous hardware parts.

The order of assembly is an end block 100 with spacer plate 300 screwed with screws 117 to each end of the main base plate 400 of which a bolt known as support shaft bolt 604 passes in each end block hole 103. On the head end of the support shaft bolt 604 is installed the pressure support arm 800 with pressure bolt 806 and locked on by set screws 803 in holes 802. Next installed on the support bolt 604 is the secondary support arm 700 that is allowed to move freely on the support shaft bolt 604 when off the door followed by the end block 100. The secondary support arm 700 has one of the set of two door drill plates series 1000 bolted on facing the end block 100. On the threaded end of the support shaft bolt 604 is installed the main support arm 600 that has bolted to it the second of the two door drill plate series 1000 also facing the end block 100.

The embodiment is attached to the door by means of pressure from the pressure bolt 806 with knob 808 from the pressure support arm 800 on the door drill plate series 1000 thus putting a clamping pressure on the door. With a door drill plate series 1000 on each door face and the main base plate 400 on the edge of the door the embodiment becomes U-shaped and wraps around the door with the door sandwiched between the two door drill plate series 1000.

The door drill plates series 1000 are templates used in identical pairs and are preferably made of ¼ inch material and each are 2¾ inch backset with the plate coming to the edge of the door as a means for support of the door during edge drilling. The holes in the door drill plate series 1000 provide a means to guide the drill bit for the proper drilling of holes in the door with the door being drilled from each side. The door drill plate series 1000 are held to the embodiment with mounting holes 1001 for two bolts 603 that go through the main support arm 600 and two bolts 704 that goes through the secondary support arm 700 and screws into threaded holes 1001 in each door drill plate series 1000. Each set of door drill plate series 1000 are built to one manufacturer specifications although some manufacturers share the same specifications and sometimes more than one set of specifications can be put on a set of door drill plates as with door drill plate 1000-1 for several brands of grade one lever handle locksets and the most common hospital paddles latches. Manufacturer specifications can be shared on one set of door drill plates with a 2⅛ cross drill hole 1003 and cut outs 1007 at 3 and 9 o'clock for 3/16 inch drill bit to drill for lock rose teeth for locksets and through bolts holes 1009 are 5/16 inch diameter and 2¾ inches apart for many grade one levers. Through bolt holes 1008 are 5/16 inch diameter and are of different location for still other grade one levers. Through bolt holes 1012 are 5/16 inch diameter and are located as required for many hospital paddles latches.

Door drill plate 1000-2 has mounting holes 1001 and 2⅛ inch cross drill hole 1003 with cut outs 1007 at 3 and 9 o'clock for 3/16 inch diameter drill to drill for lock rose teeth and the door drill plate also has through bolt holes 1010 which are 5/16 diameter and 2¹⁹/₃₂ inch apart for many grade 2 lever sets. Door drill plate 1000-3 is the same as door drill plate 1000-2 except the through bolt holes 1011 are 2³⁵/₆₄ inches apart for one specific brand of lock. The through bolt holes distance apart will vary for other door drill plates as to manufacturer specification. Door drill plates for use with access control locks or locksets that require extra holes above and/or below the main hole 1003 center line will require longer door drill plates than for the standard cylindrical locksets. Some door drill plates may need to be narrower as a means to accommodate special needs of window frames but still maintain the manufacturer's specifications. Some of the longer door drill plates may be multi piece plates and need added external clamping. Welding clamps work well as a means for added external clamping and are not a part of this patent.

Door drill plates 1000-4 are for basic installation of cylindrical door knobs and deadbolts and only have holes 1001 for mounting hole 1003 for cutting the 2⅛ inch hole and with cut outs 1007 at 3 and 9 o'clock for 3/16 inch diameter drill to drill for lock rose teeth.

Door drill plates 1000-0 are blank plates that can be modified for special locks in which door drill plates otherwise are not available and only have mounting holes 1001. The door drill plates can vary in size as to need but holes should be based on 2¾ inch backset.

Door drill plates 1000-5 are for one model of one manufacturer of stand alone electronic access control hardware. Holes 1001 are for door drill plate mounting hole 1003 is to drill the 2⅛ inch hole, cut outs 1007 at 3 and 9 o'clock for 3/16 inch diameter drill to drill for lock rose teeth, holes 1016 are to drill through bolt for the lock body, holes 1013 are to drill lock body mounting holes, hole 1014 are to drill for wires to pass through on a fire rated door and hole 1015 is to drill for wires to pass through the door on a non-fire rated door.

Door drill plate series 1000 are interchangeable between the large and small embodiment.

Alignment tool 909 is a means for aligning the embodiment on a door that already is prepared for a lockset but the preparation needs to be modified. Alignment tool 909 is made of 1 inch diameter material and is ⅞ inch diameter on one end for doors with edge hole preparation of ⅞ inch diameter.

Detailed Description of the Preferred Embodiment for a Smaller Version

The smaller version of the embodiment for preparing doors for tubular style locks having body members of two end blocks MJ10 and on side B of MJ10 is hole MJ11 that provide a means for the backset adjustment 200 to be mounted with shoulder bolt 102. On side B of end block MJ10 is the backset adjustment rotation limit pin hole M J14 that has the rotation limit pin 114 and spring 115.

The shaft bolt hole MJ12 on sides A and E of the end block MJ10 provides a means for support shaft bolt 604 that supports 3 parts known as the main support arm MJ60 also the secondary support arm MJ70 and the pressure support arm MJ80. The threaded shaft lock hole MJ13 on side C that has knob 106 that has a nylon tip to lock the end block MJ10 to the support shaft bolt 604. There are two holes MJ15 on side C that extend to side D for mounting two edge drill plates MJ20 with bolts MJ16 and nuts MJ17. The block should be of the size to allow the main support arm MJ60 and the secondary support arm MJ70 to close for a 1¼ inch thick door. Holes 606 in support shaft bolt 604 are for centering clips 605 on each end of the two end blocks MJ10 to prevent the end block MJ10 from changing adjustment that provides a means for dedicated door edge setup.

The backset adjustment 200 provides a means to quickly change of the backset adjustment for 2⅜ inch or 2¾ inch with hole 203 to depress rotation limit pin 114 to rotate backset adjustment 200 for needed setting. The rotation limit pin 114 enters a stepped hole 203 in backset adjustment 200 to prevent free rotation of the backset adjustment 200. The rotation limit pin 114 in stepped hole 203 does allow rotation adequate to self adjust for beveled doors.

The main support arm MJ60 does provide a means to mount one of the door drill plate series 1000 with mounting holes MJ62 with bolt 603 and to exert pressure on the door face to clamp the embodiment to said door. The main support arm MJ60 is fastened to support shaft bolt 604 with holes MJ61 in each end of main support arm MJ60.

The secondary support arm MJ70 provides a means to mount one of the door drill plate series 1000 with mounting holes MJ72 with bolts 704 and to exert pressure on the door face received from pressure support arm bolt 806 with knob 808 in hole MJ73 to clamp the embodiment to said door.

The secondary support arm MJ70 is fastened to support shaft bolt 604 with holes MJ71 on each end of the secondary support arm MJ70.

The pressure support arm MJ80 provides a means to exert pressure with pressure bolt 806 with knob 808 in hole MJ83 on said door drill plate series 1000 that is mounted to the secondary support arm MJ70 to provide the pressure needed to clamp the said embodiment to said door. The door is sandwiched between the two door drill plates series 1000. The pressure support arm MJ80 is fastened to support shaft bolt 604 with holes MJ81 in each end of the pressure support arm and held in place with set screws 803 in holes MJ82.

The edge drill setup for the smaller embodiment consists of two edge drill plates series MJ20 with holes MJ26 to fasten the door drill plates to the two end blocks MJ10 with one fastened to side C with holes MJ15 and the other one fastened to side D with hole MJ15, bolt MJ16 and nut MJ17. The edge drill plates series MJ20 have three holes with two holes MJ25 for a means to pre-drilling the latch plate screws and the center hole being one of four sizes. Edge drill plate MJ20-1 has a center ¼ inch hole MJ21 as a pilot hole for a hole saw. Edge drill plate MJ20-2 has a center ⅞ inch hole MJ22. Edge drill plate MJ20-3 has a center 1 inch hole MJ23. Edge drill plate MJ20-4 has a center 1⅛ inch hole MJ24. The edge drill plate MJ20-3 with a center 1 inch hole MJ23 would be standard on the embodiment.

The door drill plates series 1000 are interchangeable between the two embodiments and provide the same function for both the large and small embodiments. The door drill plates series 1000 are a means to accurately drill all the holes needed in each face of the door to meet the requirements of the lock being installed.

The alignment tool 909 can be used as a means to properly align the small embodiment to an existing door preparation for modification to that preparation.

Operation Instructions of the Preferred Embodiment

The operation of the embodiment:

1. Determine which set of door drill plates series 1000 are needed for hardware being installed and then install one door drill plate series 1000 onto main support arm 600 and the other door drill plate series 1000 onto the secondary support arm 700.

2. Determine from hardware to be installed what backset adjustment is needed and set the backset adjustment 200 by depressing the rotation limit pin 203 with a small wire and rotate backset adjustment 200 to the needed setting of 2⅜ inch backset or 2¾ inch backset. The backset adjustment 200 will self adjust for beveled or square edge door when the embodiment is installed on the door. The backset adjustment 200 is on both the top and bottom of the embodiment.

3. Determine the thickness of the door that the preferred embodiment is to be installed on.

4. Determine if the thickness of the door is the standard 1⅜ inch thick or 1¾ inch thick and if the latch assembly is to be installed in the center of the edge of the door or offset from the center of the door.

5. If the door is of standard thickness and the door edge is to be center cut and the preferred embodiment needs to be adjusted for a different door thickness than it is set for then remove centering clips 605 from the support shaft bolts 604 and loosen thumb turn 106 on each of the end blocks 100. Then slide the end blocks 100 on support shaft bolts 604 to the appropriate location for the door thickness and install centering clips 605 in support shaft bolt 604 in holes 606 on each side of each end block 100, then retighten thumb turn 106 in each end block 100 to prevent any additional movement.

6. If the door is of non-standard thickness or offset drilling is to be done then remove the centering clips 605 from each support shaft bolt 604. Loosen thumb turn 106 on each end block 100. Using a carpenter' square put a vertical line on the edge of the door in what will be the center of the latch assembly. Install the preferred embodiment on the door and center the two backset adjustments 200 to the vertical line drawn on the door edge. Lock the two thumb turns 106 that lock each end block 100 to support shaft bolt 604.

7. To install and clamp the preferred embodiment onto the door if this is a complete new installation, then:

a. A small pencil mark needs to be put on the edge of the door where the top backset adjustment 200 will be. The formula to make that mark is to measure from the outside of one backset adjustment 200 to the outside of the other backset adjustment 200 and divide by 2. Take the answer and measure from where the latch hole center is to be then measure up on the door edge and make a small horizontal mark.

b. With all adjustments of backset and proper plates premade, install the preferred embodiment on the door with aligning the top backset adjustment with the horizontal mark on the door. Tighten pressure bolt 806 with knob 808 to clamp the preferred embodiment to the door as a sandwiching of the door with the door drill plates series 1000.

c. If offset drilling or non-standard edge drilling is being done where centering clips 605 are not used then the backset adjustments 200 must be centered to the vertical pencil line on the door as talked about in number 6 and then the end blocks 100 must be locked to the support shaft bolt 604 by tightening thumb turn 106.

8. If the preferred embodiment is being installed onto an existing lock preparation then install edge drill setup 900-3 with the 1 inch hole 903 and use alignment tool 909 in the drill edge setup 900-3 to enter the existing edge drill hole in the door. If the existing edge drill hole in the door is not center of the edge of the door or this is a non-standard door then remove centering clips 605 and loosen thumb turn 106 to allow the edge drilling assembly to self center to the existing edge hole and then retighten thumb turn 106 that locks end blocks 100 to support shaft bolts 604 on each end of the preferred embodiment.

9. To install the edge drill setup series 900 or the secondary base plate 500 loosen knob 109 on each end block 100 sufficient to install or remove edge drill setup series 900 or the secondary base plate 500. When installing use the small mark on each end of the edge drill setup series 900 or the secondary base plate 500 to assist in determining the proper location of the hole for knob 109 with point to locate and enter hole 905 or hole 501. Slowly tighten knob 109 as you wiggle the attachment being installed and you will feel when it begins to enter the hole 905 or hole 501, do not fully tighten. Now do the other end of the attachment being installed in the same fashion but when you have knob 109 centered in the hole you may tighten that knob 109 and then retighten the other knob 109.

10. The holes maybe drilled in whatever order that are most convenient. Hole saws and drills in steel should be run at low speed to prevent overheating. Hole saws when drilling wood perform best when run at a high speed. When drilling the door face, first drill part way through from one side and then go to the matching hole on the other side of the door and drill to complete the hole. Drill the 3 holes on the door edge that include the 2 predrilled latch plate screw holes 906.

11. Remove the edge drill setup series 900.

12. Install the secondary base plate 500 if needed.

13. Use a router with the appropriate router guide and router bit, set at the appropriate depth to cut the mortise for the latch plate. Install the router in the off position onto the main base plate 400 or the secondary base plate 500 with the bit of the router being in the edge drill hole. Turn on router and cut the mortise then turn router off and it allow it to stop running before removing the router from the preferred embodiment to prevent damage to the preferred embodiment. There are two ways to set the router for depth of cut to cut the mortise cut out with one being with the use of the depth measuring part of slide calipers. Put the latch plate on the main base plate 400 or on the secondary base plate 500 if it is being used, then measure from the latch plate to the uncut door and transfer that measurement to the tip of the router bit and the base of the router. The other method for setting the router for depth of cut is to use a setup gauge that has three cutouts: one for residential latch 2⅜ inch backset, one for residential latch 2¾ inch backset and one for commercial latch for 2¾ inch backset. Select the right cutout and adjust the router bit to bottom out on the cutout when the ends of the gauge are against the router base.

14. Remove the preferred embodiment from the door.

15. In some situations extra clamping from an external clamp that is not a part of this preferred embodiment will be needed to keep the preferred embodiment from moving on door.

16. It is recommended on most installations that a paper towel be used between the door drill plate series 1000 and the door to protect the door from being marred.

17. To square the corners of the latch plate mortise cut out in wood, the use of a corner chisel works very well but is not a part of this preferred embodiment.

18. If a router is used to cut a door edge that is made of steel or aluminum then it is recommended to use a double flute carbide router bit and grease the door edge in the area that is being cut to help the bit from getting clogged. Great care must be taken not to break the bit and extra safety precautions should be taken.

19. A full face safety shield should be used for eye and face protection and steel toed shoes in case the preferred embodiment is dropped. No loose clothing near the drill bits should be used.

Operation Instructions of the Small Preferred Embodiment

The operation of the preferred embodiment:

1. Determine which set of door drill plates series 1000 are needed for hardware being installed and then install one door drill plate series 1000 onto main support arm MJ60 and the other door drill plate series 1000 onto secondary support arm MJ70.

2. Determine from hardware to be installed what backset adjustment is needed and set the backset adjustment 200 by depressing the rotation limit pin 203 with a small wire and rotate backset adjustment 200 to the needed setting of 2⅜ inch backset or 2¾ inch backset. The backset adjustment 200 will self adjust for beveled or square edge door when the embodiment is installed on the door. The backset adjustment 200 is on both the top and bottom of the embodiment.

3. Determine the thickness of the door that the preferred embodiment is to be installed on.

4. Determine if the thickness of the door is the standard 1⅜ inch thick or 1¾ inch thick and if the latch assembly is to be installed in the center of the edge of the door or offset from the center of the door.

5. If the door is of standard thickness and the door edge is to be center cut and the preferred embodiment needs to be adjusted for a different door thickness than it is set for then remove centering clips 605 from the support shaft bolts 604 and loosen thumb turn 106 on each of the end blocks MJ10. Then slide the end blocks MJ10 on support shaft bolts 604 to the appropriate location for the door thickness and install centering clips 605 in support shaft bolt 604 in holes 606 on each side of each end block MJ10, then retighten thumb turn 106 in each end block MJ10 to prevent any additional movement.

6. If the door is of non-standard thickness or offset drilling is to be done then remove the centering clips 605 from each support shaft bolt 604. Loosen thumb turn 106 on each end block MJ10. Using a carpenter' square put a vertical line on the edge of the door in what will be the center of the latch assembly. Install preferred embodiment on the door and center the two backset adjustments 200 to the vertical line drawn on the door edge. Lock the two thumb turns 106 that lock each end block MJ10 to support shaft bolt 604.

7. To install and clamp the preferred embodiment onto the door if this is a complete new installation, then:
   a. A small pencil mark needs to be put on the edge of the door where the top backset adjustment 200 will be. The formula to make that mark is to measure from the outside of one backset adjustment 200 to the outside of the other backset adjustment 200 and divide by 2. Take the answer and measure from where the latch hole center is to be up on the edge door and make a small horizontal mark.
   b. With all adjustments of backset and proper plates premade, install the preferred embodiment on the door with aligning the top backset adjustment with the horizontal mark on the door. Tighten pressure bolt 806 with knob 808 to clamp the preferred embodiment to the door as a sandwiching of the door with the door drill plate series 1000.
   c. If offset drilling or non-standard edge drilling is being done where centering clips 605 are not used then the backset adjustments 200 must be centered to the vertical pencil line on the door edge as talked about in number 6 and then the end blocks MJ10 must be locked to the support shaft bolt 604 by tightening thumb turn 106.

8. If the preferred embodiment is being installed onto an existing lock preparation with edge drill plate MJ20-3 with the 1 inch hole MJ23 installed use alignment tool 909 in the edge drill plate hole MJ23 to enter the existing edge hole in the edge of the door. If the existing edge drill hole is not center of the edge of the door or this is a non-standard door then remove centering clips 605 and loosen thumb turn 106 on each end block to allow the edge drilling assembly to self-center to the existing edge hole and then retighten thumb turn 106 on each end block MJ10 that locks end blocks MJ10 to support shaft bolts 604.

9. The holes maybe drilled in whatever order that are most convenient. Hole saws and drills in steel should be run at low speed to prevent overheating. Hole saws when drilling wood perform best when run at a high speed. When drilling the door face, first drill part way through from one side and then go to the matching hole on the other side of the door and drill to complete the hole. Drill the 3 holes on the door edge that include the 2 predrilled latch plate screw holes MJ25.

10. Remove the preferred embodiment from the door.

11. In some situations extra clamping from an external clamp that is not a part of this preferred embodiment will be needed to keep preferred embodiment from moving on the door.

12. It is recommended on most installations that a paper towel be used between the door drill plate series 1000 and the door to protect the door from being marred.

13. A full face safety shield should be used for eye and face protection and steel toed shoes in case the preferred embodiment is dropped. No loose clothing near the drill bits should be used.

I claim:

1. A device for drilling and routing features on the faces and edge of a door, comprising:
   a main support arm (600), a pressure support arm (800), a secondary support arm (700), two support shaft bolts (604) connecting the main support arm and pressure support arm, the secondary support arm being slidably mounted on the support shaft bolts between the main support arm and pressure support arm, and a pressure bolt (806) threaded through the pressure support arm for moving the secondary support arm on the support shaft bolts in order to clamp the device on a door;
   a plurality of pairs of door drill plates which may be removably attached to the secondary support arm and main support arm, each individual pair of plates having identical patterns of drill guide holes for guiding drills, and each pair of plates having a pattern of drill guide holes different than the other pairs of plates;
   an end block slidably mounted on each of the support shaft bolts between the main support arm and secondary support arm, each of the end blocks having a thumb turn screw for securing the end block in a desired selected location on the support shaft bolts, the shaft bolts each having two transverse holes (606) and removable centering clips (605) which may be inserted into the transverse holes for locating the end blocks in known positions on the shaft bolts between the centering clips;
   a backset adjustment member (200) mounted on each end block for adjusting the position of the patterns of the drill guide holes on the faces of the door, the backset adjustment member being generally rectangular and having a non-centrally located pivot hole, at least two of the edges of the rectangular adjustment member being located different distances from the pivot hole than each other, a shoulder bolt (102) extending through the pivot hole and permitting rotation of the backset adjustment member, such that the at least two edges may be individually placed in a location to engage the edge of the door, the end block housing a spring (115) for pushing a retaining pin (114), each of the at least two edges of the backset adjustment member having a corresponding retaining pin receiving hole;
   a main base plate (400) removably connected between the end blocks, the main base plate having a center cut out hole (402) defining a pattern for a router bit to cut a mortise cut on the edge of the door, a secondary base plate (500) removably connected between the end blocks, the secondary base plate being placed on the main base plate and having a center cut out hole smaller than the center cut out hole of the main base plate, and a plurality of door edge drill templates (900) that may be separately placed on the main base plate in place of the secondary base plate, the plurality of edge drill templates each having a unique pattern of drill guide holes for drilling holes on the edge of the door.

2. The device of claim 1, further comprising the main base plate having a hole 1⅜ inch wide by 2½ inch high.

3. The device of claim 2, further comprising the secondary base plate having a hole 1¼ inch wide by 2½ inch high.

4. The device of claim 1, further comprising the main base plate having drill guide inserts.

\* \* \* \* \*